(12) United States Patent
Jager et al.

(10) Patent No.: US 12,187,205 B2
(45) Date of Patent: Jan. 7, 2025

(54) METHODS AND APPARATUSES FOR ACTUATING A VEHICLE COMPONENT

(71) Applicant: ACCELERATED SYSTEMS INC., Waterloo (CA)

(72) Inventors: Willem Jager, Cambridge (CA); Tim Lambert, Los Angeles, CA (US); Muhammad Ikhlas, Waterloo (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 923 days.

(21) Appl. No.: 16/597,979

(22) Filed: Oct. 10, 2019

(65) Prior Publication Data

US 2020/0115949 A1 Apr. 16, 2020

Related U.S. Application Data

(60) Provisional application No. 62/744,914, filed on Oct. 12, 2018.

(51) Int. Cl.
| | | |
|---|---|---|
| *E05F 15/71* | (2015.01) | |
| *B60J 7/057* | (2006.01) | |
| *B60R 16/023* | (2006.01) | |
| *B60S 1/08* | (2006.01) | |

(52) U.S. Cl.
CPC ......... *B60R 16/0237* (2013.01); *B60J 7/0573* (2013.01); *E05F 15/71* (2015.01); *B60S 1/0818* (2013.01); *E05Y 2900/531* (2013.01); *E05Y 2900/534* (2013.01); *E05Y 2900/536* (2013.01); *E05Y 2900/542* (2013.01); *E05Y 2900/546* (2013.01); *E05Y 2900/548* (2013.01); *E05Y 2900/55* (2013.01)

(58) Field of Classification Search
CPC .. B60J 7/0573; B60R 16/0237; B60S 1/0818; E05F 15/71; E05F 15/695; E05Y 2900/531; E05Y 2900/534; E05Y 2900/536; E05Y 2900/542; E05Y 2900/546; E05Y 2900/548; E05Y 2900/55; E05Y 2400/45; E05Y 2800/414
See application file for complete search history.

(56) References Cited

U.S. PATENT DOCUMENTS

| | | | | |
|---|---|---|---|---|
| 6,129,093 | A * | 10/2000 | Kelly | B60S 1/0477 15/250.19 |
| 8,567,129 | B2 * | 10/2013 | Suzuki | E05B 81/20 49/506 |
| 11,274,487 | B2 * | 3/2022 | Hattori | E05F 15/72 |
| 2019/0291698 | A1 * | 9/2019 | Camella | B60S 1/66 |
| 2019/0292818 | A1 * | 9/2019 | Cumbo | E05C 17/003 |
| 2019/0390488 | A1 * | 12/2019 | Salter | E05B 85/103 |

\* cited by examiner

*Primary Examiner* — James M McPherson
*Assistant Examiner* — Paulo Roberto Gonzalez Leite
(74) *Attorney, Agent, or Firm* — Nyssa Inc.

(57) ABSTRACT

There is provided a method for actuating a component of a vehicle. The method may include applying an initial force to the component to actuate the component, and generating a movement indicator based on whether the component moves in response to the initial force. Moreover, the method may include receiving a freezing indicator associated with a likelihood of the component being immobilized due to freezing. If the movement indicator is negative and the freezing indicator is affirmative, the method also includes applying an adjusted force to the component to mobilize the component.

20 Claims, 9 Drawing Sheets

METHODS AND APPARATUSES FOR ACTUATING A VEHICLE COMPONENT

CROSS-REFERENCE TO RELATED APPLICATION

This application claims the benefit of and priority from U.S. Provisional Patent Application No. 62/744,914, filed on Oct. 12, 2018, which is incorporated herein by reference in its entirety.

FIELD

The present specification relates to methods and apparatuses for actuating a component of a vehicle, and in particular to methods and apparatuses for actuating an immobilized component of a vehicle.

BACKGROUND

Vehicles may comprise a plurality of components. Some of these components may be movable. Actuators may be used to apply a force to these movable components to move the components.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . ." and "one or more . . ." language.

An aspect of the present specification provides a method of actuating a component of a vehicle, the method comprising: applying an initial force to the component to actuate the component; generating a movement indicator based on whether the component moves in response to the initial force; receiving a freezing indicator associated with a likelihood of the component being immobilized due to freezing; and if the movement indicator is negative and the freezing indicator is affirmative, applying an adjusted force to the component to mobilize the component.

The component may comprise at least one of a window pane, a wiper, a tail gate, a trunk lid, a hood, a side view mirror, a fuel inlet access barrier, an electrical charging inlet access barrier, a movable sun roof, a movable antenna, a movable running board, a movable roof element, and a door.

The freezing indicator may be based on an ambient temperature.

The freezing indicator may be further based on at least one of: an altitude of the vehicle; an ambient pressure; and an output from a moisture sensor.

The freezing indicator may be based on an output from an ice sensor.

The applying the adjusted force may comprise applying the adjusted force being greater than the initial force.

The applying the adjusted force may comprise pulsing the adjusted force at a given frequency.

The applying the adjusted force may comprise applying the adjusted force to the component along a direction different than a corresponding direction of application of the initial force to the component.

The applying the adjusted force may comprise applying the adjusted force to cause the component to resonate at a resonance frequency of the component.

The method may further comprise: generating a further movement indicator based on whether the component moves in response to the adjusted force; and if the further movement indicator is negative, applying a further adjusted force to the component to mobilize the component.

Another aspect of the present specification provides a controller for actuating a component of a vehicle, the controller comprising: a memory to store instructions executable by a processor; and the processor in communication with the memory, the processor to: control an actuator coupled to the component to apply an initial force to the component to actuate the component; generate a movement indicator based on whether the component moves in response to the initial force; receive a freezing indicator associated with a likelihood of the component being immobilized due to freezing; and if the movement indicator is negative and the freezing indicator is affirmative, control the actuator to apply an adjusted force to the component to mobilize the component.

The component may comprise at least one of a window pane, a wiper, a tail gate, a trunk lid, a hood, a side view mirror, a fuel inlet access barrier, an electrical charging inlet access barrier, a movable sun roof, a movable antenna, a movable running board, a movable roof element, and a door.

The freezing indicator may be based on an ambient temperature.

The freezing indicator may be further based on at least one of: an altitude of the vehicle; an ambient pressure; and an output from a moisture sensor.

The freezing indicator may be based on an output from an ice sensor.

To control the actuator to apply the adjusted force the processor may be to control the actuator to apply the adjusted force being greater than the initial force.

To control the actuator to apply the adjusted force the processor may be to control the actuator to pulse the adjusted force at a given frequency.

To control the actuator to apply the adjusted force the processor may be to control the actuator to apply the adjusted force to the component along a direction different than a corresponding direction of application of the initial force to the component.

To control the actuator to apply the adjusted force the processor may be to control the actuator to apply the adjusted force to cause the component to resonate at a resonance frequency of the component.

The processor may be further to: generate a further movement indicator based on whether the component moves in response to the adjusted force; and if the further movement indicator is negative, control the actuator to apply a further adjusted force to the component to mobilize the component.

BRIEF DESCRIPTION OF THE DRAWINGS

Some example implementations of the present specification will now be described with reference to the attached Figures, wherein.

DETAILED DESCRIPTION

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. In addition, the headings and Abstract of the Disclosure provided herein are for convenience only and do not interpret the scope or meaning of the implementations.

Figure 1:
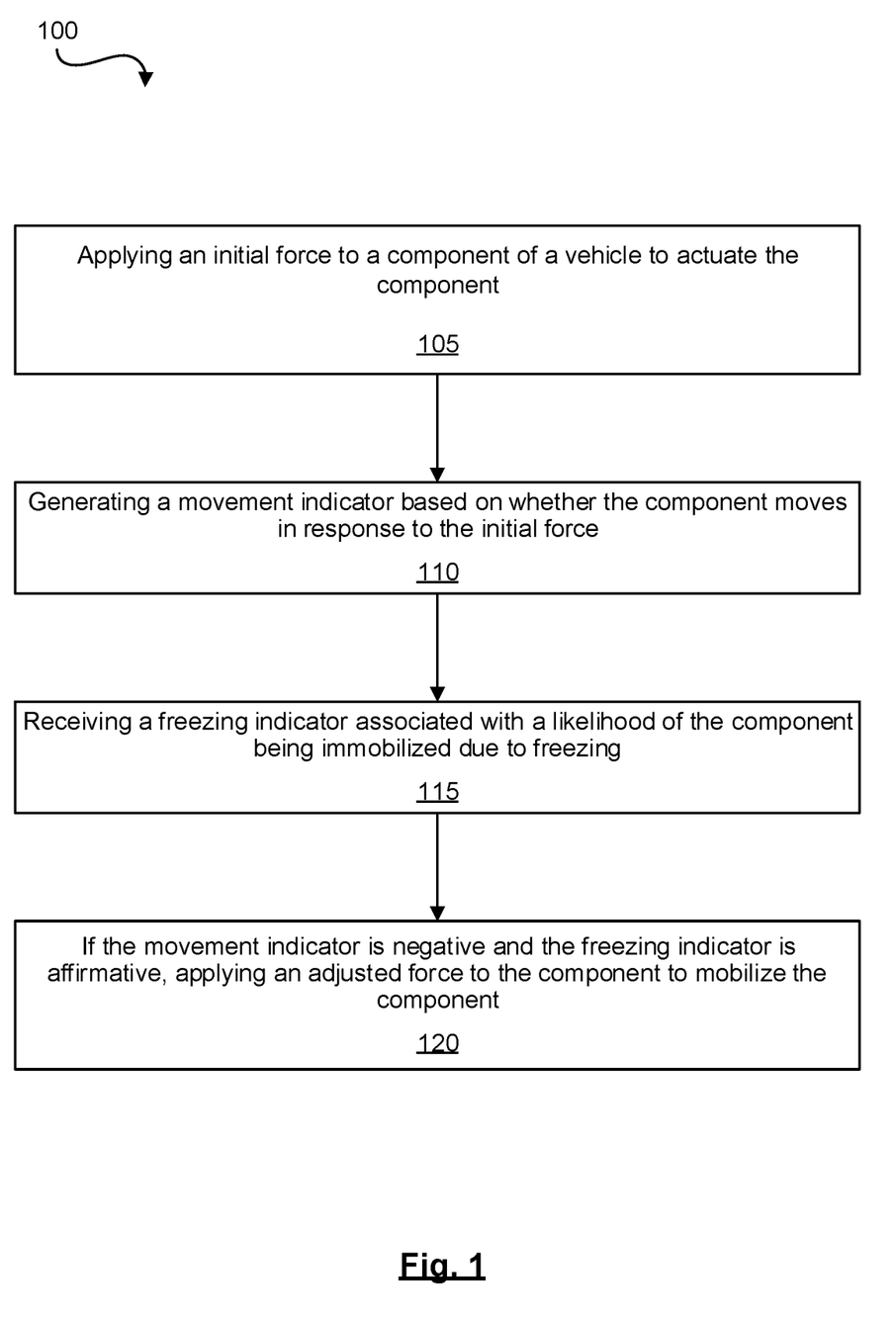
FIG. 1 shows a flowchart of an example method which may be used to actuate a component of a vehicle, in accordance with a non-limiting implementation of the present specification.

Under certain circumstances, a movable component of a vehicle may become immobilized. FIG. 1 shows a flowchart of an example method 100, which may be used to actuate a component of a vehicle. In some examples, method 100 may be used to mobilize an immobilized component of a vehicle.

Vehicle may refer to an apparatus or system that is capable of moving from a first location to a second location different than the first location. In some examples, a vehicle may be capable of moving itself or a payload from the first location to the second location. In some examples, the payload may comprise people, goods, and the like. A vehicle may be capable of moving on or in a variety of media including moving on the ground, on rails or tracks, under ground, on water, under water, in the air, outside of the atmosphere, and the like. Examples of vehicles may include cars, trucks, motorcycles, bicycles, golf carts, trains, planes, helicopters, unmanned aerial vehicles (UAVs), boats, ships, rockets, spaceships, and the like. In this description, "vehicle component", "component of a vehicle", or "component" may be used to refer to a component of a vehicle.

At box 105 of method 100, an initial force may be applied to the component to actuate the component. In some examples, the initial force may comprise a mechanical force, such as a pulling force, a pushing force, a rotational torque, and the like. In some examples, the initial force may comprise the default force used to move the component during operation of the vehicle. The initial force may be applied using an actuator, such as an electrical actuator, a pneumatic actuator, a hydraulic actuator, and the like. In some examples, the electrical actuator may comprise an electric motor, a servo, and the like. Moreover, in some examples, actuating the component may comprise moving the component relative to another component of the vehicle.

The component may comprise a component of the vehicle, which component is movable relative to another component of the vehicle. In some examples, the vehicle component may comprise at least one of a window pane, a wiper, a tail gate, a trunk lid, a hood, a side view mirror, a fuel inlet access barrier, an electrical charging inlet access barrier, a movable sun roof, a movable antenna, a movable running board, a movable roof element, a door, and the like. In some examples, the fuel access barrier may comprise a fuel cap, a fuel inlet access door, and the like. Similarly, in some examples, the electrical charging inlet access barrier may comprise a charging inlet cap, a charging inlet access door, and the like. Furthermore, in some examples, the movable roof element may comprise one or more movable elements of a retractable roof. Such retractable or movable roof elements may be present, for example, in convertible vehicles.

At box 110, a movement indicator may be generated based on whether the component moves in response to the initial force. For example, if the component moves in response to the application of the initial force, the movement indicator may be set to affirmative. If the component does not move in response to the initial force, then the movement indicator may be set to negative. In some examples, the movement indicator may be set to one to indicate movement of the component in response to the initial force, or to zero to indicate lack of movement of the component in response to the application of the initial force. In other words, one may be used as an affirmative movement indicator and zero as a negative movement indicator.

It is also contemplated that in some examples the movement indicator may comprise or be based on further information regarding the parameters of the movement of the component, such as how far the component moves in response to the initial force, how fast the component moves in response to the initial force, and the like. In such examples, thresholds may be defined for how far or fast the component moves in response to the initial force, and based on whether these thresholds are met, the movement indicator may then be set to affirmative or negative.

Moreover, in some examples, the movement of the component may be sensed using a movement or position sensor to sense the movement of or changes in the position of the component respectively. In some examples, the actuator used to apply the initial force may itself be used to sense the movement of the component. For example, when the actuator comprises an electric motor having Hall sensors, counting or tracking the Hall transitions of the motor may provide a measure of the movement of the component that is mechanically coupled to the motor.

At box 115, a freezing indicator may be received, which freezing indicator may be associated with a likelihood of the component being immobilized due to freezing. In some examples, in the presence of moisture under freezing conditions, the moisture may freeze on or around the component. This formation of ice on or around the component may immobilize the component by preventing it from moving in response to the application of the initial force.

The freezing indicator may be based on or reflect whether conditions for immobilization of the component due to freezing exist. In some examples, if the conditions are such that freezing is possible, the freezing indicator may be set to affirmative. If freezing is not possible, the freezing indicator may be set to negative. For example, the freezing indicator may be based on the ambient temperature. If the ambient temperature is above the freezing point of water, the conditions of immobilization due to freezing do not exist and the freezing indicator may be set to negative. If the temperature is at or below the freezing point, immobilization due to freezing may be possible, and the freezing indicator may be set to affirmative.

It is also contemplated that in some examples the freezing indicator may comprise or be based on further information regarding the likelihood of immobilization due to freezing. For example, the freezing indicator may indicate whether the temperature is slightly below the freezing point of water in which case there may be a relatively lower likelihood of immobilization due to freezing, or whether the temperature is significantly below the freezing point in which case there may be a relatively higher likelihood of immobilization due to freezing. In such examples, thresholds may be defined for the temperature or the associated likelihood of immobilization due to freezing. Based on whether these thresholds are met, the freezing indicator may then be set to affirmative or negative.

In addition to the ambient temperature, in some examples the freezing indicator may also be based on other factors which may impact the freezing point of water. For example, the ambient pressure also impacts the freezing point of water. Moreover, as the altitude of the vehicle impacts the ambient pressure, in some examples, the freezing indicator may also be based on the altitude of the vehicle. Furthermore, in some examples the presence of moisture may also be taken into account in determining the likelihood of component immobilization due to freezing as indicated by the freezing indicator. In such examples, an output from a moisture sensor may be used to detect the presence of moisture. If moisture is absent, then the freezing indicator may be set to negative. If moisture is present and the ambient temperature is below the freezing point, then the freezing indicator may be set to affirmative.

In some examples, the moisture sensor may be incorporated into the wipers of the vehicles, or be disposed elsewhere onboard the vehicle. Moreover, in some examples the moisture sensor may be external to the vehicle. It is also contemplated that in some examples the moisture sensing may be based on the record of weather conditions for the location of the vehicle. Examples of such weather conditions may include precipitation, mist, fog, dew point, relative humidity, and the like. In some examples, the moisture sensing parameters may be derived from measurements or predictions of the weather conditions at or near the location of the vehicle.

In addition, in some examples the freezing indicator may be based on an output from an ice sensor. If ice is detected on or around the vehicle component, the freezing indicator may be set to affirmative. If ice is not detected on or around the component, the freezing indicator may be set to negative. It is also contemplated that in some examples the freezing indicator may be based on further information regarding the characteristics of the ice. For example, the freezing indictor may reflect the varying likelihood of immobilization due to freezing based on characteristics of the ice such as the amount of the ice, spatial distribution of the ice, hardness of the ice, and the like. In some examples, ice sensors may sense ice by sensing physical parameters (such as weight, and the like), optical properties (such as optical transmission, and the like), acoustic properties (such as acoustic transmission, and the like), electrical properties (such as electrical conductivity, and the like), and the like.

In some examples, receiving the freezing indicator may comprise retrieving the freezing indicator from machine-readable memory, obtaining the freezing indicator from a source onboard or external to the vehicle, generating or calculating the freezing indicator based on a physical property or sensor output relevant to the likelihood of immobilization due to freezing, and the like.

At box 120, if the movement indicator is negative and the freezing indicator is affirmative, an adjusted force may be applied to the component to mobilize the component. The movement indicator being negative may indicate that the component has been immobilized, and the freezing indicator being affirmative may indicate that there is likelihood that the immobilization is due to freezing. In response, the adjusted force may be applied to the component to attempt to break the ice and mobilize the component.

In some examples, the adjusted force may be adjusted relative to the initial force by adjusting one or more characteristics of the force such as its magnitude, direction, duration of application, variation over time, and the like. For example, the adjusted force may have a magnitude that is greater than the magnitude of the initial force. Moreover, in some examples applying the adjusted force may comprise pulsing the adjusted force at a given frequency. In the pulsing examples, one or more of the magnitude and variation over time (e.g. pulsing) of the adjusted force may be different than those of the initial force.

Furthermore, in some examples, applying the adjusted force may comprise applying the adjusted force to the component along a direction different than a corresponding direction of application of the initial force to the component. In some examples, the direction of the adjusted force may be about parallel to but in an opposite direction to the direction of the initial force. In addition, in some examples, the direction of the adjusted force may be different than the direction of the initial force. It is also contemplated that in some examples the direction of the adjusted force may be about the same as the direction of the initial force.

Moreover, in some examples, applying the adjusted force may comprise applying the adjusted force to cause the component to resonate at or near a resonance frequency of the component. In such examples, the deformations of the component itself, caused by the component's resonance, may contribute to breaking the ice and mobilizing the component. In some examples, the immobilizing ice may have formed against or abutting a pliable element, which element may be a part of the component or a part of the rest of the vehicle. Examples of such pliable elements may include weather stripping, wiper blades, pliable seals, and the like. This pliable element may absorb some of the adjusted force intended to break the ice, thereby undermining the ice-breaking. Causing the component to resonate may allow the deformation of the component itself to break the ice, thereby obviating the need to exert the ice-breaking adjusted force between the component and the pliable element.

Furthermore, in some examples, method 100 may further comprise generating a further movement indicator based on whether the component moves in response to the adjusted force. Generating the further movement indicator may be similar to the generation of the movement indicator, with a difference being that the further movement indicator is generated based on whether the component moves in response to the application of the adjusted force. In other words, in some examples, if the component moves in response to the application of the adjusted force, the further movement indicator may be set to affirmative. If the component does not move in response to the adjusted force, the further movement indicator may be set to negative.

The generation of the further movement indicator may be used to check whether applying the adjusted force has succeeded in breaking the ice and mobilizing the previously-immobilized component. It is also contemplated that in some examples the further movement indicator may comprise or be based on further information regarding the parameters of the movement of the component, such as how far the component moves in response to the adjusted force, how fast the component moves in response to the adjusted force, and the like. In such examples, thresholds may be defined for how far or fast the component moves in response to the adjusted force, and based on whether these thresholds are met, the further movement indicator may be set to affirmative or negative.

If the further movement indicator is negative, a further adjusted force may be applied to the component to mobilize the component. The adjustments to the adjusted force to obtain the further adjusted force may be similar to the adjustments to the initial force to obtain the adjusted force, as described herein. For example, characteristics of the further adjusted force may be adjusted relative to those of the adjusted force, which characteristics may include the force's magnitude, direction, duration of application, variation over time, and the like.

In this manner, in some examples, upon applying the adjusted force, a determination may be made as to whether the component is mobilized in response to the application of the adjusted force. If the determination is negative, a further adjusted force may be applied to break the ice and mobilize the component. In some examples, the cycles of checking for movement and then adjusting the force may be repeated until the component is mobilized. Moreover, in some examples, the repetition of these cycles may be restricted by parameters such as time duration, number of cycle repetitions, maximum force magnitudes or frequencies, and the like. Such restrictions may prevent excessive or "infinite" loops of the movement assessment and force adjustment cycles.

In some examples, the maximum magnitude of the adjusted force may be restricted to prevent the magnitude of the force from increasing to a level that may become potentially harmful to human users of the vehicle, or to the physical integrity of the vehicle or its components. Furthermore, in some examples, the position or speed of the movement of the component in response to the initial, adjusted, or further adjusted forces may be monitored to prevent pinching, crushing, or other injuries to the users of the vehicle. In example components such as window panes where the risk of injuries is present in one direction of movement (e.g. closing the pane) and not the other, the application of the initial or adjusted forces in the potentially injury-causing direction may be monitored or restricted more closely relative to the application of the force in the non-injury-causing direction. Moreover, in some examples, the adjusted force may be applied in the non-injury-causing direction, and not in the potentially injury-causing direction. In the example of the window pane, in some examples the adjusted force may be applied in the window opening direction, and not in the window closing direction.

In addition, in some examples, the initial, adjusted, or further adjusted forces may be applied so long as a user of the vehicle continues to provide an input that requests movement of the component or the application of those forces. In such examples, if the user discontinues the input requesting movement of the component, the application of the initial, adjusted, or further adjusted forces may cease. This, in turn, may enhance safety by ensuring that the initial, adjusted, or further adjusted forces are not applied without continued input from the user requesting the application of these forces.

Furthermore, in some examples the position or movement of the component in response to the application of the initial, adjusted, or further adjusted forces may be monitored, and these forces may be modified (or adjusted) as the component nears the ends of its range of motion. In some examples, the force applied to the component or its speed of motion may be reduced near the ends of the component's range of motion. This in turn may enhance safety and reduce the likelihood of damage to the component or the vehicle during the movement of the component. In the example of a window pane, the force applied to the pane or its speed of motion may be reduced when the pane is nearing its fully open or fully closed positions. In this manner, the risk of injury to users (e.g. pinching or crushing) may be reduced. In addition, the risk of damage to the window frame, the power window mechanism, or the pane itself may also be reduced.

It is also contemplated that in some examples the steps of method 100 may be performed in an order other than the one shown in FIG. 1. In addition, it is contemplated that in some examples some of the steps may be omitted or other steps may be added to method 100 and the other methods described herein. For example, in some examples the freezing indicator may be received. If the freezing indicator is affirmative, the initial force may be selected to have some ice-breaking qualities. For example, the initial force may be selected to have a higher magnitude than a default force for moving the component, the initial force may be pulsed, and the like. If the component does not move in response to the application of this initial force having some ice-breaking qualities, then the movement indicator may be set to negative. Based on this negative movement indicator, an adjusted force may be applied to the component. This adjusted force may have enhanced ice-breaking qualities compared to the ice-breaking qualities of the initial force.

Figure 2:
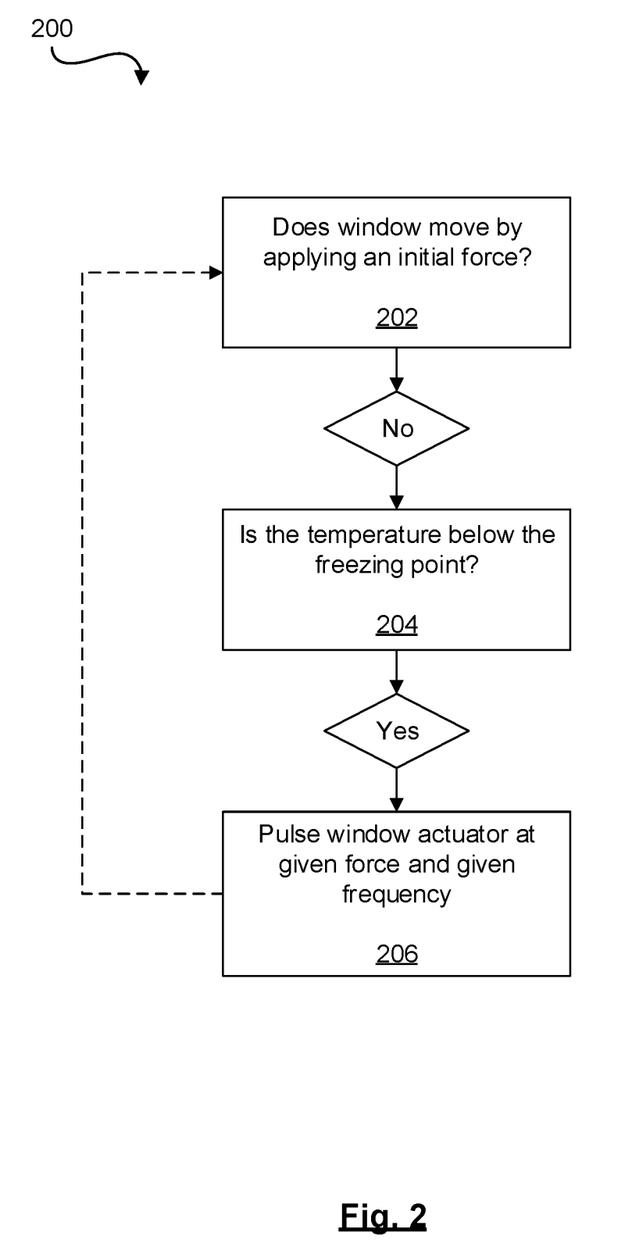
FIG. 2 shows a flowchart of another example method which may be used to actuate a component of a vehicle, in accordance with a non-limiting implementation of the present specification.

Turing now to FIG. 2, a flowchart is shown of an example method 200. Method 200 is an example of method 100, wherein the component is a window pane, the freezing indicator is based on the ambient temperature, and the application of the adjusted force comprises pulsing the window actuator at a given force and given frequency. In this description, window panes may be referred to as "windows" in short. It is contemplated that the features and functions described in relation to method 200 may also apply to the actuation of vehicle components other than window panes. In addition, it is contemplated that in some examples, the features and functions described in relation to method 200 may also be present in method 100 and the other methods described herein.

At box 202, a controller may determine whether the window moves by applying an initial force. This determination may comprise generating a movement indicator. The controller may be similar to controller 300 described in relation to FIG. 3, or another one of the controllers described herein. It is also contemplated that in some examples, the steps of method 200 may be performed by an apparatus or system other than a controller. If the window does not move, this may indicate that an obstruction or hinderance is present, and method 200 moves to box 204. In addition, if the window does not move, a movement indicator may be set to negative.

At box 204, the controller may determine if the temperature is below the freezing point. This freezing point may refer to the freezing point of water. In other examples where freezing of other liquids may also contribute to the window not moving, the freezing point of those other liquids may also be considered. The controller may determine the temperature using sensors onboard the vehicle, or may receive the temperature from other sources external to the controller or external to the vehicle. In some examples, the sensor may be part of the controller. In some examples, the controller may also receive information regarding pressure or elevation of the vehicle, and determine the freezing temperature of water at the given pressure or elevation by calculating or determining from a look-up table the freezing temperature at the given pressure or elevation.

The combination of a negative determination at box 202 and a positive determination at box 204 may suggest that the window may be frozen, i.e. immobilized due to freezing. If at box 204 it is determined that the temperature is below the freezing point, then method 200 may move to box 206 where the controller may control a widow actuator to pulse at a given force and a given frequency. A positive determination at box 204 may correspond to receiving a positive freezing indicator. The given force and initial force may comprise forces applied by the actuator to the window in order to move the window. This pulsing, and its given force and given frequency, may be chosen and able to crack or otherwise loosen the frozen moisture affecting the window, thereby mobilizing the window and allowing it to move. In other words, this pulsing may act as ice-breaking. In some examples, after applying the pulsing, method 200 may return to box 202 to determine whether the widow can move by applying the initial force. If after the pulsing or ice-breaking the window does move by applying the initial force, the controller may exit method 200 and resume default actuation of the window using the initial force.

In some examples, at box 206 the duration of pulsing may be predetermined, after which duration the pulsing stops and method 200 moves back to box 202. In other examples, method 200 may progress from box 206 to box 202 after one cycle of pulsing, and then repeat method 200.

Moreover, in some examples the given force for pulsing may be set to be higher than the initial force used for actuating the window. Furthermore, in some examples the given force may be escalating up to a maximum. The maximum may be predetermined. In some examples of the escalating force, the given force may be increased in each iteration of method 200. That is to say, when method 200 moves from box 206 to box 202, and then returns back to box 206, the given force during pulsing upon return to box 206 may be higher than the given force used during the prior pulsing cycle. In such examples, the given force increases from one iteration of method 200 to the next iteration.

Moreover, in some examples of the escalating force, when multiple pulses are performed during a given duration, each of the given multiple pulses may have a higher given force than its prior pulse. In such examples, the given forces increase during a given iteration of method 200. It is contemplated that in some examples, in addition to or instead of the changes in the magnitude of the force, the frequency of the pulsing may also be changed in a manner analogous to the escalation of forces described herein.

In some examples, method 200 iterates more than once through boxes 202, 204, and 206 within a given period of time that may be short enough such that it would be unlikely for the temperature to have changed materially in the time period. In such examples, the iterations of method 200 after the first iteration may skip box 204 to proceed directly from box 202 to box 206.

Furthermore, in some examples method 200 may be subject to a maximum number of iterations. In some examples this maximum may apply within a given period of time, after which period of time the number or count of iterations may reset to zero. In examples where the maximum number of iterations is in effect, when moving from box 206 to box 202 of method 200, the controller my compare the number of performed iterations of method 200 to the maximum, and move to box 202 only if the number of iterations is below the maximum. This may prevent the actuator being stuck in an endless or "infinite" ice-breaking loop.

In addition, in some vehicles the window may be most likely to be frozen when it is in the closed position because in the closed position the window has the largest contact area with the window frame along the edges of the window. In these examples, before starting at box 202, method 200 may comprise an additional step of determining whether the window is in the closed position, and if the determination is affirmative, then move to box 202.

It is contemplated that method 100, method 200, and the other methods described herein may be applied to one or more vehicle components such as a window pane, a wiper, a tail gate, a trunk lid, a hood, a side view mirror, a fuel inlet access barrier, an electrical charging inlet access barrier, a movable sun roof, a movable antenna, a movable running board, a movable roof element, a door, and the like. In addition, it is contemplated that in some examples method 100, method 200, and the other methods described herein may be applied to structures or systems other than vehicles, where movable components may be immobilized due to freezing, such as power garage doors, and the like.

Furthermore, in some examples, method 100, method 200, and the other methods described herein may sense a property or parameter in addition to or instead of a freezing indicator, and may be able to sense or overcome an obstruction or hinderance other than those caused by freezing.

While some examples of the initial and adjusted forces described herein include mechanical forces, it is contemplated that in some examples the adjusted or further adjusted forces may comprise non-mechanical components. For example, the adjusted or further adjusted forces may comprise application of thermal or electrical energy to heat the component or other parts of the vehicle, to loosen or melt the ice immobilizing the component. In addition, it is contemplated that in some examples the adjusted or further adjusted forces may be similar to or about the same as the initial force.

Figure 3:
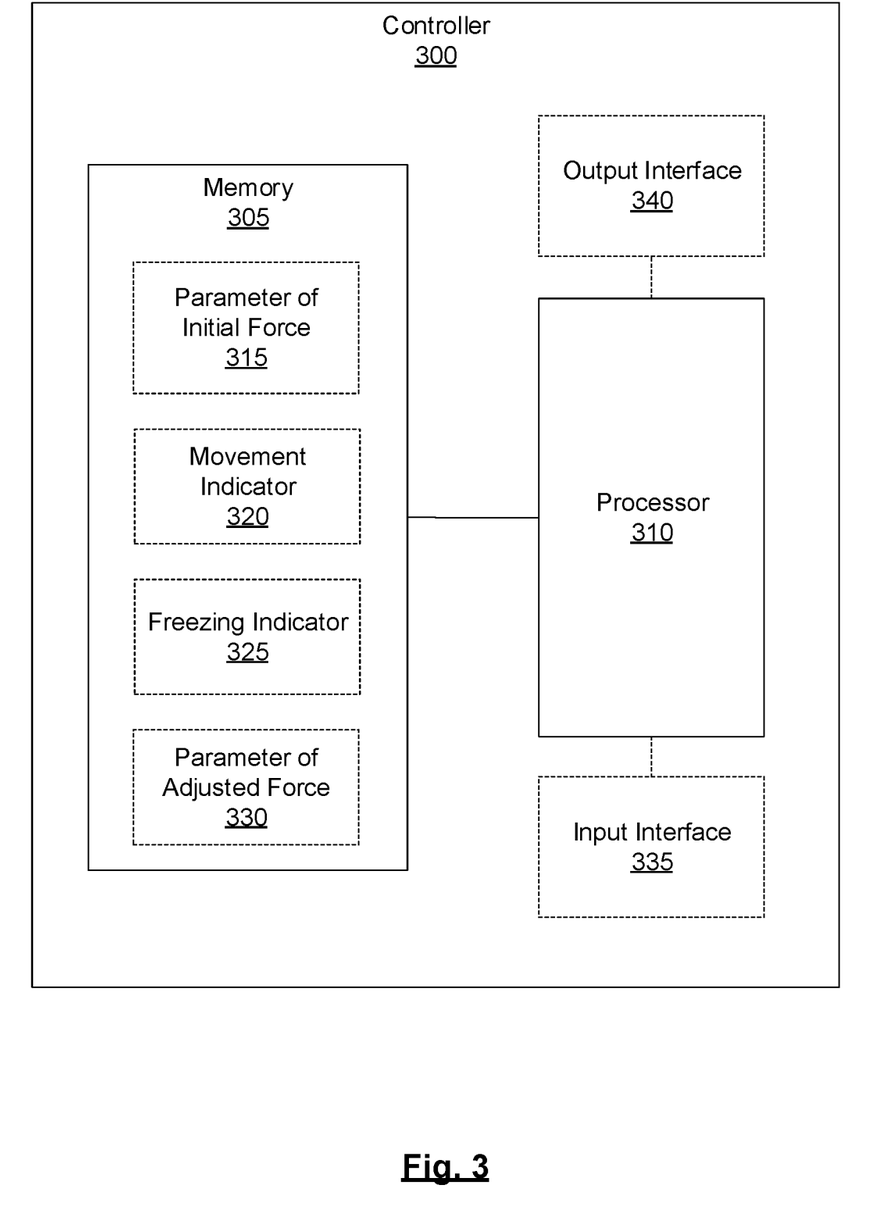
FIG. 3 shows a schematic representation of an example controller for actuating a component of a vehicle, in accordance with a non-limiting implementation of the present specification.

Turning now to FIG. 3, a schematic representation is shown of an example controller 300 for actuating a component of a vehicle. Controller 300 comprises a memory 305 to store instructions executable by a processor. Controller 300 also comprises a processor 310 in communication with memory 305. Controller 300 may have the features and perform the functions described in relation to method 100, method 200, and the other methods described herein.

Processor 310 may comprise a central processing unit (CPU), a graphics processing unit (GPU), a microcontroller, a microprocessor, a processing core, a field-programmable gate array (FPGA), or similar device capable of executing instructions. Processor 310 may cooperate with memory 305 to execute instructions.

Memory 305 may comprise a non-transitory machine-readable storage medium which may comprise an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

In some examples, memory 305 may store one or more of a parameter of the initial force 315, a movement indicator 320, a freezing indicator 325, and a parameter of adjusted force 330. In some examples, parameters of the initial or adjusted forces may comprise values of the magnitudes of these forces, directions of the forces, durations of application of the forces, variations of the forces over time, and the like. In FIG. 3, parameter of the initial force 315, movement indicator 320, freezing indicator 325, and parameter of adjusted force 330 are shown in dashed lines to indicate that in some examples one or more of these entities need not be stored in memory 305. In some examples, the entities not stored in memory 305 may be stored elsewhere in controller 300, or outside of controller 300. Moreover, in some examples one or more of the entities not stored in memory 305 may be stored in transitory machine-readable memory as-needed during the operation of controller 300.

In addition, in some examples controller 300 may comprise an input interface 335. In some examples, controller 300 may receive via input interface 335 control inputs from a user of the vehicle. Moreover, in some examples, controller 300 may receive via input interface 335 input from sensors such as a temperature sensor, an altitude sensor, a pressure sensor, a moisture sensor, an ice sensor, a component position or movement sensor, and the like. Furthermore, in some examples controller 300 may receive via input interface 335 one or more of parameter of the initial force 315, movement indicator 320, freezing indicator 325, and parameter of adjusted force 330.

Moreover, in some examples controller 300 may receive via input interface 335 feedback from the component or the actuator coupled to the component. In some examples, such feedback may comprise position of the component, speed of movement of the component, whether the component is immobilized or mobilized, and the like. In some examples, controller 300 may also receive other inputs via input interface 335.

In FIG. 3 input interface 335 is depicted in dashed lines to signify that in some examples controller 300 need not comprise an input interface. In such examples the functions of the input interface may be performed by a different component of controller 300 or by an apparatus or system other than controller 300.

Moreover, in some examples controller 300 may also comprise an output interface 340. In some examples, controller 300 may communicate via output interface 340 with one or more actuators to actuate the component of the vehicle. For example, controller 300 or its processor 310 may control the actuator to apply an initial force or an adjusted force to the component. In addition, in some examples, output interface 340 may output other types of control signals or information. For example, it is contemplated that in some examples controller 300 may display or otherwise provide information to a user of the vehicle. The information may be related to the settings or the operating parameters of the component or the vehicle.

In FIG. 3 output interface 340 is depicted in dashed lines to signify that in some examples controller 300 need not comprise an output interface. In such examples the functions of the output interface may be performed by a different component of controller 300 or by an apparatus or system other than controller 300.

It is also contemplated that in some examples controller 300 may comprise a housing (not shown) to which memory 305 and processor 310 may be directly or indirectly secured. In addition, in some examples input and output interfaces 335, 340 may also be secured to the housing.

In some examples, processor 310 may control an actuator coupled to the component to apply an initial force to the component to actuate the component. Processor 310 may control the actuator to apply the initial force according to parameter of initial force 315. Processor 310 may also generate movement indicator 320 based on whether the component moves in response to the initial force. Moreover, processor 310 may receive freezing indicator 325 associated with a likelihood of the component being immobilized due to freezing. Furthermore, if the movement indicator is negative and the freezing indicator is affirmative, processor 310 may control the actuator to apply an adjusted force to the component to mobilize the component. Processor 310 may control the actuator to apply the adjusted force according to parameter of adjusted force 330. The features and functions of controller 300 and its processor 310 may be similar to the features and functions described in relation to method 100, method 200, and the other methods described herein.

In some examples, the component may comprise at least one of a window pane, a wiper, a tail gate, a trunk lid, a hood, a side view mirror, a fuel inlet access barrier, an electrical charging inlet access barrier, a movable sun roof, a movable antenna, a movable running board, a movable roof element, a door, and the like.

Moreover, in some examples, freezing indicator 320 may be based on an ambient temperature. In some examples, freezing indicator 320 may be further based on at least one of an altitude of the vehicle, an ambient pressure, and an output from a moisture sensor. Furthermore, in some examples, freezing indicator 320 may be based on an output from an ice sensor. The moisture or ice sensors may be a part of controller 300, onboard the vehicle and outside controller 300, or external to the vehicle.

Furthermore, in some examples, to control the actuator to apply the adjusted force processor 310 may control the actuator to apply the adjusted force being greater than the initial force. In such examples, parameter of initial force 315 and parameter of adjusted force 330 may specify the relative magnitudes of the initial and adjusted forces.

In addition, in some examples, to control the actuator to apply the adjusted force processor 310 may control the actuator to pulse the adjusted force at a given frequency. In some examples, this given frequency may be specified by parameter of adjusted force 330. Moreover, in some examples, to control the actuator to apply the adjusted force processor 310 may control the actuator to apply the adjusted force to the component along a direction different than a corresponding direction of application of the initial force to the component. In some examples, the direction of application of the adjusted force may be specified by parameter of adjusted force 330.

Moreover, in some examples, to control the actuator to apply the adjusted force processor 310 may control the actuator to apply the adjusted force to cause the component to resonate at a resonance frequency of the component. The manner of application of the adjusted force to cause such resonance may be specified by parameter of adjusted force 330.

In some examples, processor 310 may also generate a further movement indicator based on whether the component moves in response to the adjusted force. In some examples, this further movement indicator may also be stored in memory 305. If the further movement indicator is negative, processor 310 may control the actuator to apply a further adjusted force to the component to mobilize the component. The parameters of the further adjusted force may be specified by a parameter of adjusted force stored in memory 305.

Figure 4:
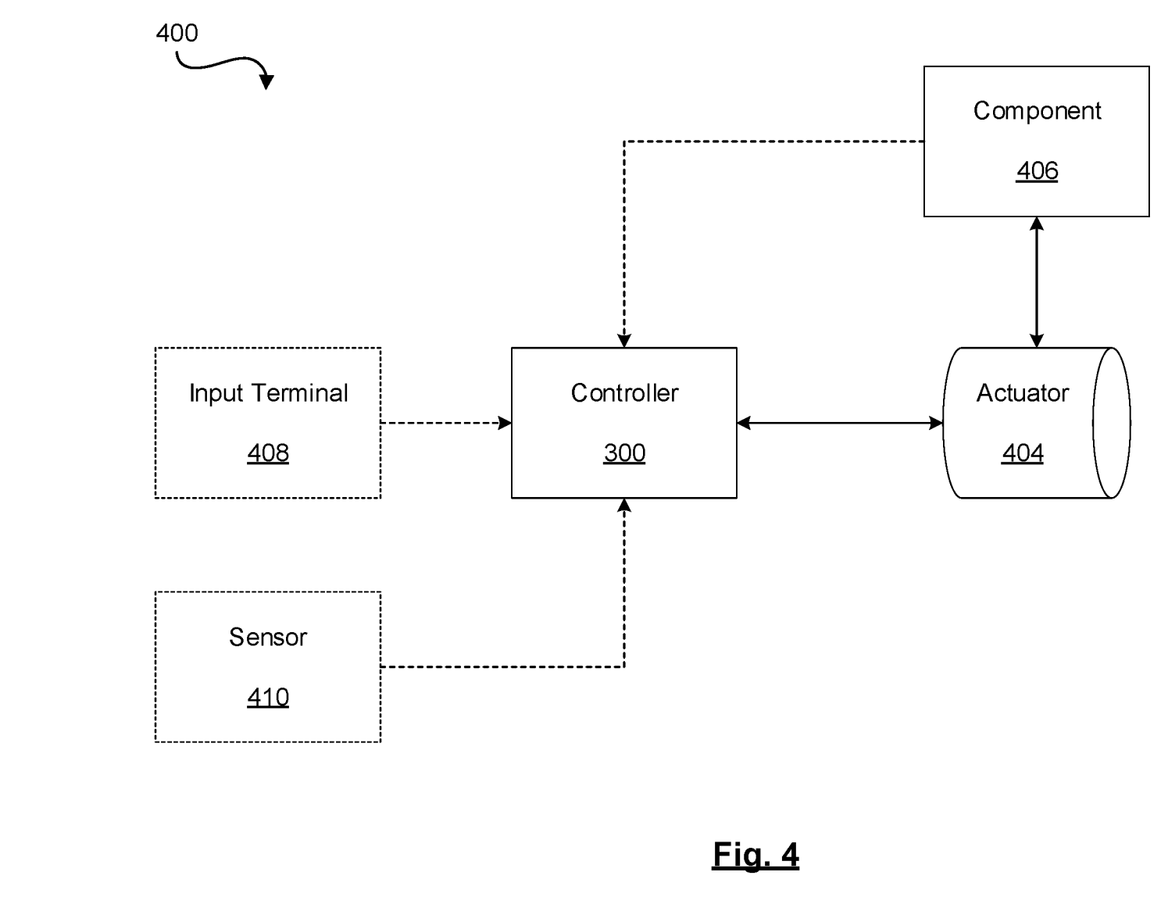
FIG. 4 shows a schematic representation of an example system for actuating a component of a vehicle, in accordance with a non-limiting implementation of the present specification.

Turning now to FIG. 4, a schematic representation is shown of an example system 400 for actuating a component 406 of a vehicle. System 400 comprises controller 300 which is in communication with an actuator 404, which is in turn mechanically coupled to component 406 of the vehicle. As discussed above, in some examples controller 300 may comprise one or more processors 310, machine-readable memory 305, and input or output interfaces 335, 340 for communicating with and controlling actuator 404. Moreover, in some examples controller 300 may be integrated into or be part of another component of system 400 or the vehicle. For example, the controller may be integrated into or be a part of the actuator, other components of the vehicle, and the like.

In some examples, actuator 404 may comprise an electrical actuator such as an AC brushless permanent magnet motor, and the like. Actuator 404 may be directly or indirectly mechanically coupled to component 406, to allow actuator 404 to apply a force to component 406 to move or mobilize component 406. In operation, actuator 404 may apply an initial force in order actuate component 406.

Various obstructions or hinderances may prevent actuator 404 from being able to actuate or move component 406. In other words, when such obstructions or hinderances are present, when actuator 404 applies the initial force, component 406 may not move. In such situations, component 406 may be described as having been immobilized.

One example of such obstructions or hinderances may comprise component 406 freezing in cold weather. In other words, as temperature falls below the freezing point of water, moisture present on or around component 406 may freeze component 406 to the vehicle components adjacent component 406. Such a component whose movement is hindered due to frozen moisture may be referred to as a frozen component. In order to mobilize such a frozen component, controller 300 may carry out a method such as method 100, method 200, or another one of the methods described herein.

In some examples, in addition to controlling actuator 404, controller 300 may also receive feedback from actuator 404 regarding the movement or position of component 406. Moreover, in some examples, controller 300 may also receive feedback from component 406 regarding the movement or position of component 406. It is contemplated that in some examples controller 300 need not receive feedback from actuator 404 or component 406. In such examples, controller 300 may receive feedback regarding the position or movement of component 406 from another source or component in system 400, or from a source of component external to system 400.

In addition, in some examples system 400 may comprise a sensor 410 and an input terminal 408 in communication with controller 300. Sensor 410 may provide information upon which the freezing indicator may be based. For example, sensor 410 may comprise one or more of a temperature sensor, an altitude sensor, a pressure sensor, a moisture sensor, an ice sensor, and the like. Input terminal 408, in turn, may be used to receive input from a user of the vehicle to actuate component 406. In some examples, controller 300 may continue to control actuator 404 to apply the initial, adjusted, or further adjusted forces to component 406 so long as the user continues to provide input at input terminal 408 requesting actuation of component 406.

In FIG. 4 sensor 410 and input terminal 408 are shown in dashed lines to signify that in some examples system 400 need not comprise one or both of sensor 410 and input terminal 408. In such examples, the functions performed by sensor 410 and input terminal 408 may be performed by other components of system 400, or by components or systems outside of system 400. It is contemplated that in some examples system 400 may be used to carry out method 100, method 200, and the other methods described herein.

Figure 5:
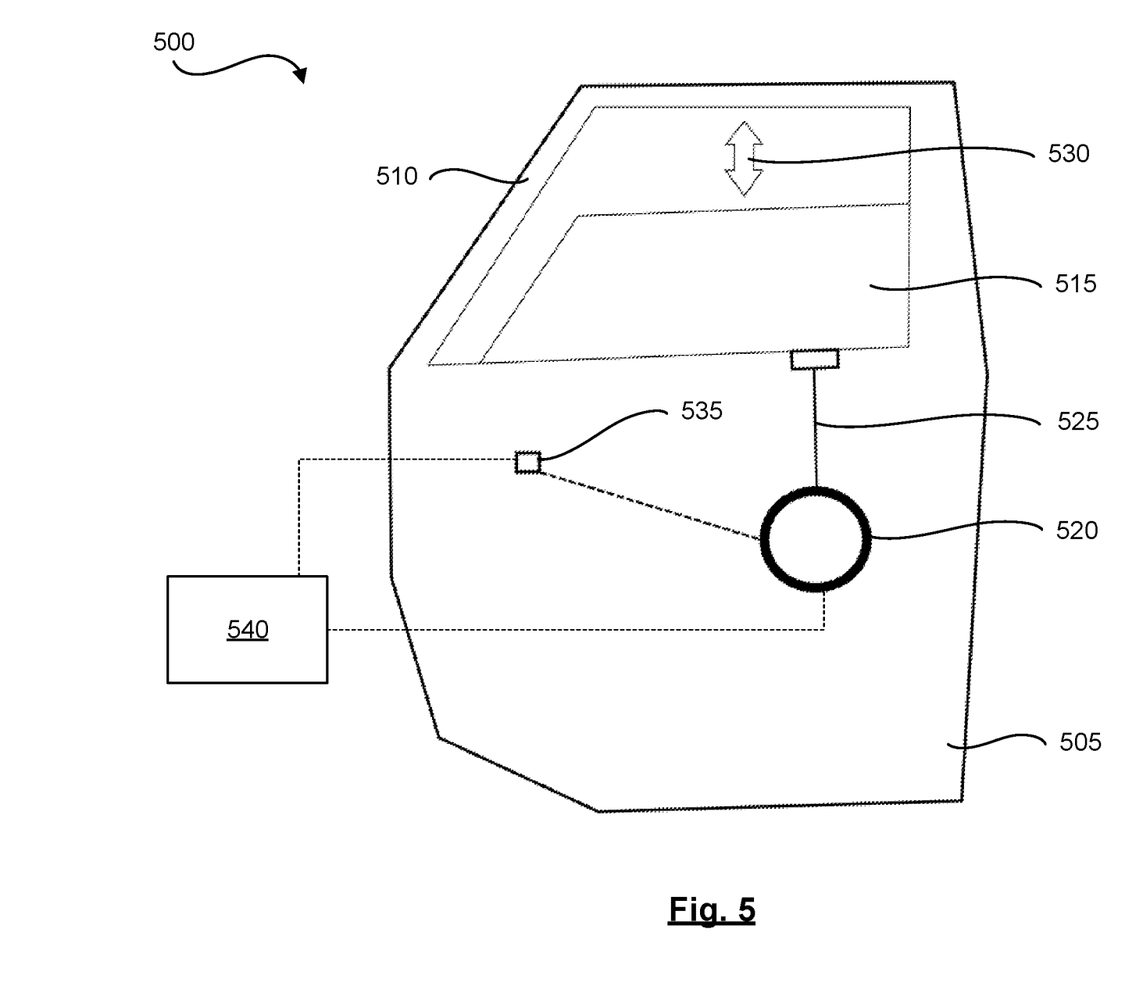
FIG. 5 shows a schematic representation of an example door system of a vehicle, in accordance with a non-limiting implementation of the present specification.

Turning now to FIG. 5, a schematic representation is shown of an example door system 500 of a vehicle. System 500 comprises a door 505 comprising a window frame 510 and a window pane 515 that is movable relative to door 505 and window frame 510. System 500 also comprises an actuator 520 that is mechanically coupled to window pane 515 via a mechanical link 525. Actuator 520 may apply a force to pane 515 to retract or extend pane 515 along directions 530.

Furthermore, system 500 may comprise a window switch 535 to allow a user of the vehicle to provide input to actuate window pane 515. Moreover, system 500 may comprise a controller 540 in communication with actuator 520. In some examples, controller 540 may also be in communication with switch 535. While FIG. 5 shows switch 535 as being in direct communication with actuator 520, it is contemplated that in some examples switch 535 need not be in direct communication with actuator 520.

Moreover, it is contemplated that in some examples controller 540 may be similar to controller 300, actuator 520 may be similar to actuator 404, and switch 535 may be similar to input terminal 408. Controller 540 may have the features and perform the functions described herein in relation to controller 300, method 100, method 200, and the other methods described herein. For example, if pane 515 is immobilized due to being frozen to door 505 or frame 510, controller 540 may control actuator 520 to apply an adjusted force to pane 515 to break the ice and mobilize pane 515.

Figure 6:
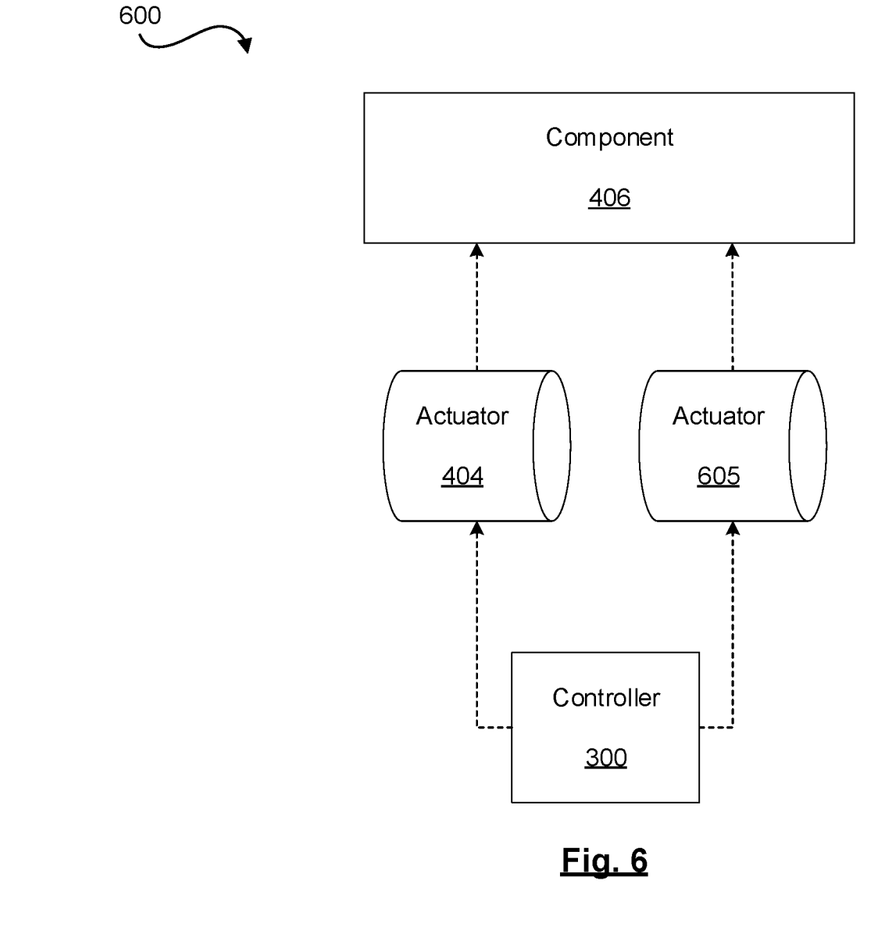
FIG. 6 shows a schematic representation of another example system for actuating a component of a vehicle, in accordance with a non-limiting implementation of the present specification.

Turning now to FIG. 6, a schematic representation is shown of an example system 600 for actuating a component of a vehicle. Similar to system 400, system 600 comprises controller 300, actuator 404, and component 406. A difference between systems 400 and 600 is that system 600 comprises an additional actuator 605. Actuators 404 and 605 may be of the same or similar type. For example, actuators 404 and 605 may both comprise rotary actuators such as electric motors. In system 600, actuator 404 may be used to apply the initial force. Actuator 605 may be used to apply an additional mechanical force to component 406 to actuate component 406. When the adjusted force is to be applied to component 406, this additional mechanical force may be used to combine with the initial force applied by actuator 404 to generate the adjusted force.

In some examples, to generate the adjusted force the force applied by actuator 605 may be used instead of the initial force applied by actuator 404. In other words, in such examples actuator 404 may be used to apply the initial force and actuator 605 may be used to apply the adjusted force. Moreover, in some examples the force applied by actuators 404 and 605 may be along about parallel directions.

Figure 7:
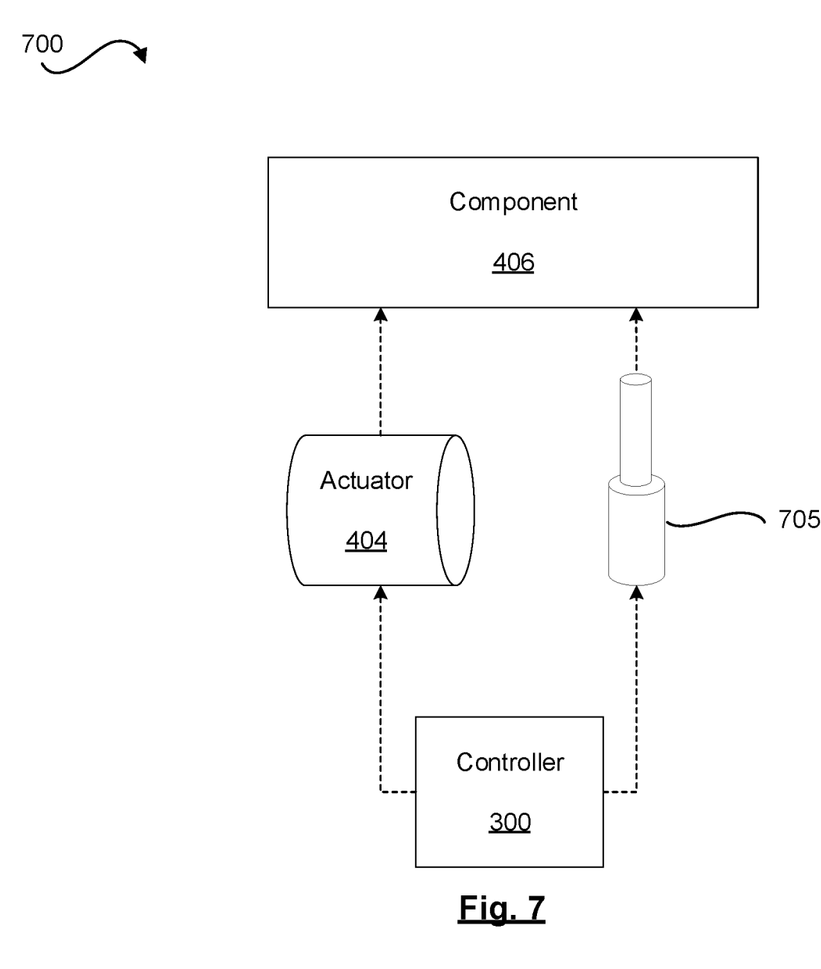
FIG. 7 shows a schematic representation of yet another example system for actuating a component of a vehicle, in accordance with a non-limiting implementation of the present specification.

FIG. 7 in turn shows a schematic representation of an example system 700 for actuating a component of a vehicle. System 700 may be similar to system 600, with a difference being the in system 700 rotary actuator 605 is replaced with a linear actuator 705. In some examples, linear actuator 705 may comprise a servo, a pneumatic actuator, a hydraulic actuator, and the like. In some examples, the force applied by actuator 705 may be combined with the initial force applied by actuator 404 to form the adjusted force applied to component 406.

Moreover, in some examples, to generate the adjusted force the force applied by actuator 705 may be used instead of the initial force applied by actuator 404. In other words, in such examples actuator 404 may be used to apply the initial force and actuator 705 may be used to apply the adjusted force. Moreover, in some examples the force applied by actuators 404 and 705 may be along about parallel directions.

Figure 8:
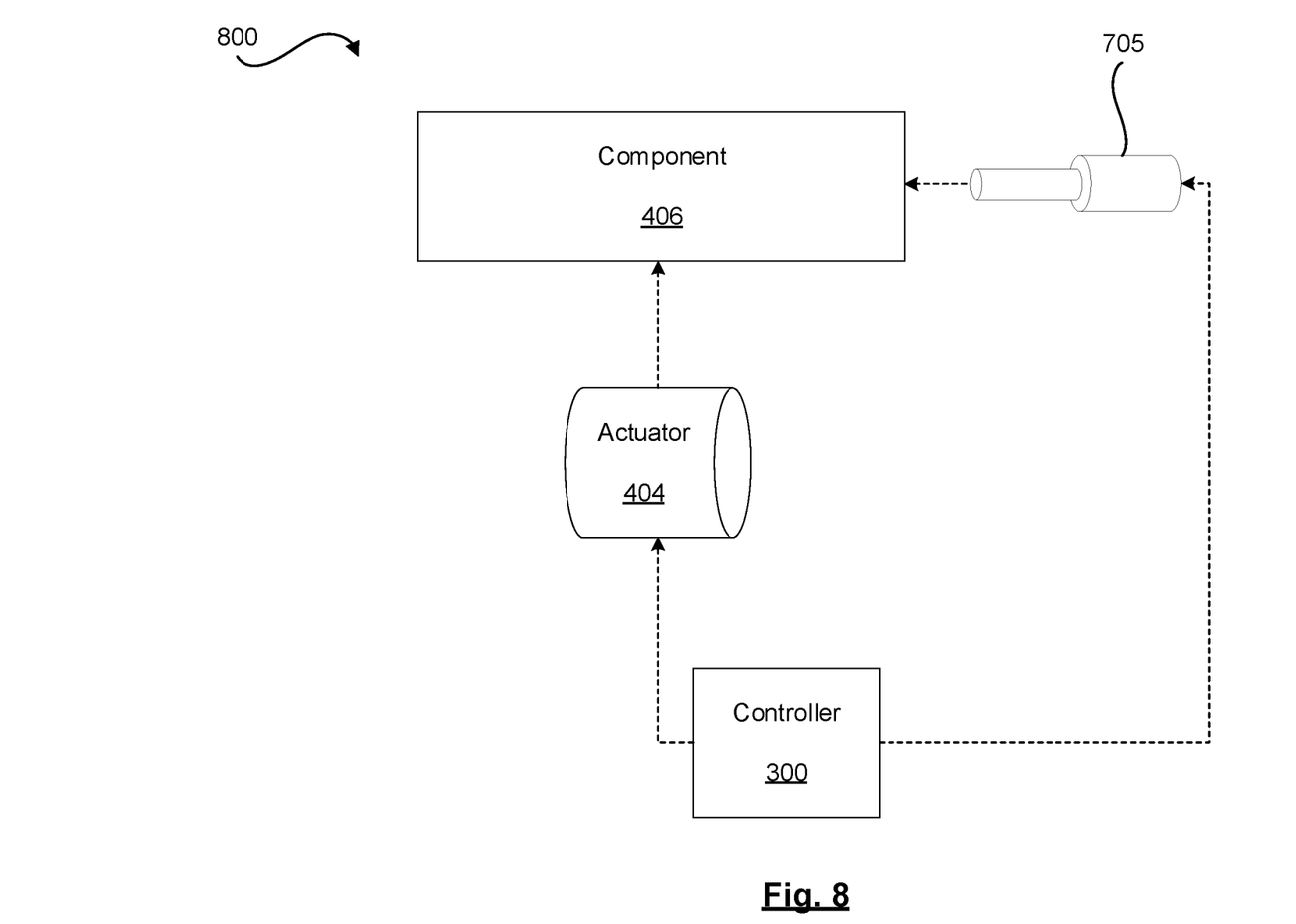
FIG. 8 shows a schematic representation of yet another example system for actuating a component of a vehicle, in accordance with a non-limiting implementation of the present specification.

Turning now to FIG. 8, a schematic representation is shown of an example system 800 for actuating a component of a vehicle. System 800 may be similar to system 700, with a difference being that in system 800 the force applied on component 406 by actuator 705 is along a direction different than the direction of the initial force applied to component 406 by actuator 404. While FIG. 8 shows the forces applied by actuator 404 and 705 as being on the same plane, it is also contemplated that in some examples, the force applied by actuator 705 may be out of the plane of FIG. 8. Applying forces to component 406 along different directions may allow for moving, deflecting, or resonating component 406 to facilitate breaking the ice or mobilizing component 406.

Figure 9:
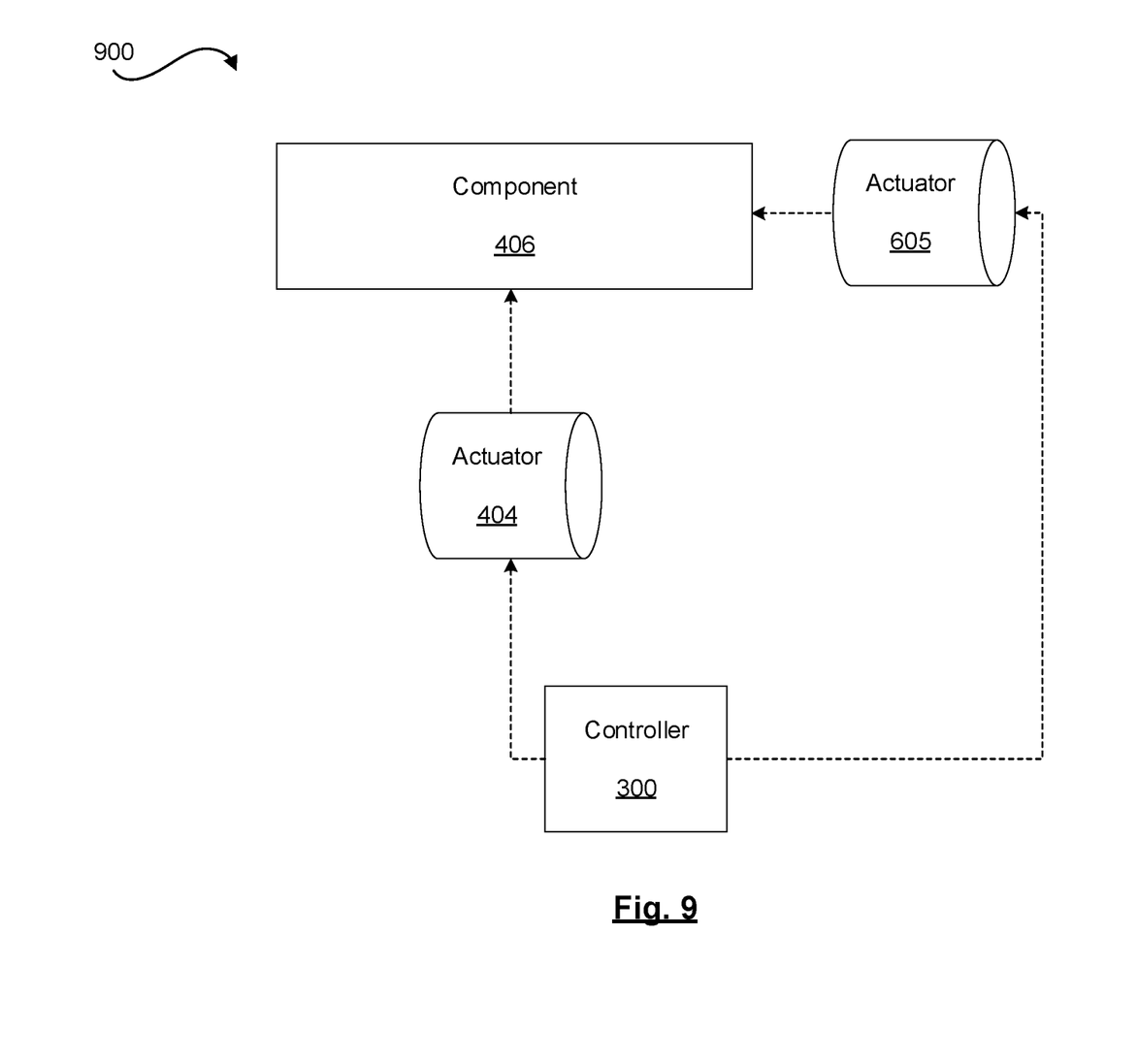
FIG. 9 shows a schematic representation of yet another example system for actuating a component of a vehicle, in accordance with a non-limiting implementation of the present specification.

FIG. 9, in turn, shows a schematic representation of an example system 900 for actuating a component of a vehicle. System 900 may be similar to system 800, with a difference being that in system 900 actuator 705 is replaced with actuator 605. Applying forces to component 406 along different directions using actuators 404 and 605 may also allow for moving, deflecting, or resonating component 406 to facilitate breaking the ice or mobilizing component 406.

It is contemplated that in some examples one, two, or a larger number of actuators, of the same or different types, may be controlled by a controller to apply forces on the vehicle component that are along the same or different directions. These forces may then be used to mobilize the otherwise immobilized component by breaking ice or removing other impediments to the movement of the component.

In addition, it is contemplated that method 100, method 200, and the other methods described herein may be performed by controller 300, controller 540, and the other controllers described herein. In addition, it is contemplated that method 100, method 200, and the other methods described herein may also be performed by apparatuses and systems other than the controllers described herein. Furthermore, it is contemplated that controller 300, controller 540, and the other controllers described herein may perform method 100, method 200, and the other methods described herein. It is also contemplated that controller 300, controller 540, and the other controllers described herein may have features or perform functions other than those described in relation to method 100, method 200, and the other methods described herein.

It is also contemplated that in some examples, method 100, method 200, and the other methods described herein may be stored in non-transitory computer-readable storage media as machine-readable or computer-readable instructions. Such instructions, upon execution by a processor, may cause the processor to perform method 100, method 200, and the other methods described herein.

It should be recognized that features and aspects of the various examples provided herein may be combined into further examples that also fall within the scope of the present disclosure.

The invention claimed is:

1. A method of actuating a component of a vehicle, the method comprising:
  applying an initial force to the component to actuate the component;
  generating a movement indicator based on whether the component moves in response to the initial force;
  receiving a freezing indicator associated with a likelihood of the component being immobilized due to freezing; and
  if the movement indicator is negative and the freezing indicator is affirmative:
    adjusting the initial force based on the movement indicator and the freezing indicator to obtain an adjusted force; and
    applying the adjusted force to the component to mobilize the component.

2. The method of claim 1, wherein the component comprises at least one of a window pane, a wiper, a tail gate, a trunk lid, a hood, a side view mirror, a fuel inlet access barrier, an electrical charging inlet access barrier, a movable sun roof, a movable antenna, a movable running board, a movable roof element, and a door.

3. The method of claim 1, wherein the freezing indicator is based on an ambient temperature.

4. The method of claim 3, wherein the freezing indicator is further based on at least one of:
  an altitude of the vehicle;
  an ambient pressure; and
  an output from a moisture sensor.

5. The method of claim 1, wherein the freezing indicator is based on an output from an ice sensor.

6. The method of claim 1, wherein the applying the adjusted force comprises applying the adjusted force being greater than the initial force.

7. The method of claim 1, wherein the applying the adjusted force comprises pulsing the adjusted force at a given frequency.

8. The method of claim 1, wherein the applying the adjusted force comprises applying the adjusted force to the component along a direction different than a corresponding direction of application of the initial force to the component.

9. The method of claim 1, wherein the applying the adjusted force comprises applying the adjusted force to cause the component to resonate at a resonance frequency of the component.

10. The method of claim 1, further comprising:
generating a further movement indicator based on whether the component moves in response to the adjusted force; and
if the further movement indicator is negative, applying a further adjusted force to the component to mobilize the component.

11. A controller for actuating a component of a vehicle, the controller comprising:
a memory to store instructions executable by a processor; and
the processor in communication with the memory, the processor configured to:
control an actuator coupled to the component to apply an initial force to the component to actuate the component;
generate a movement indicator based on whether the component moves in response to the initial force;
receive a freezing indicator associated with a likelihood of the component being immobilized due to freezing; and
if the movement indicator is negative and the freezing indicator is affirmative:
adjust the initial force based on the movement indicator and the freezing indicator to obtain an adjusted force; and
control the actuator to apply the adjusted force to the component to mobilize the component.

12. The controller of claim 11, wherein the component comprises at least one of a window pane, a wiper, a tail gate, a trunk lid, a hood, a side view mirror, a fuel inlet access barrier, an electrical charging inlet access barrier, a movable sun roof, a movable antenna, a movable running board, a movable roof element, and a door.

13. The controller of claim 11, wherein the freezing indicator is based on an ambient temperature.

14. The controller of claim 13, wherein the freezing indicator is further based on at least one of:
an altitude of the vehicle;
an ambient pressure; and
an output from a moisture sensor.

15. The controller of claim 11, wherein the freezing indicator is based on an output from an ice sensor.

16. The controller of claim 11, wherein to control the actuator to apply the adjusted force the processor is configured to control the actuator to apply the adjusted force being greater than the initial force.

17. The controller of claim 11, wherein to control the actuator to apply the adjusted force the processor is configured to control the actuator to pulse the adjusted force at a given frequency.

18. The controller of claim 11, wherein to control the actuator to apply the adjusted force the processor is configured to control the actuator to apply the adjusted force to the component along a direction different than a corresponding direction of application of the initial force to the component.

19. The controller of claim 11, wherein to control the actuator to apply the adjusted force the processor is configured to control the actuator to apply the adjusted force to cause the component to resonate at a resonance frequency of the component.

20. The controller of claim 11, wherein the processor is further configured to:
generate a further movement indicator based on whether the component moves in response to the adjusted force; and
if the further movement indicator is negative, control the actuator to apply a further adjusted force to the component to mobilize the component.

* * * * *